United States Patent

Kramer et al.

[11] Patent Number: 5,555,636
[45] Date of Patent: Sep. 17, 1996

[54] DRYER

[75] Inventors: Walter Kramer, Kreuzlingen, Switzerland; Holger Kühnau, Konstanz, Germany

[73] Assignee: Motan Holding GmbH, Konstanz, Germany

[21] Appl. No.: 399,092

[22] Filed: Feb. 24, 1995

[30] Foreign Application Priority Data

Feb. 25, 1994 [DE] Germany ............................ 44 06 322.9
Jul. 14, 1994 [DE] Germany ............................ 44 24 846.6

[51] Int. Cl.[6] ........................................................ F26B 19/00
[52] U.S. Cl. ................................... 34/86; 34/168; 34/514
[58] Field of Search ............................... 34/86, 168, 169, 34/77, 175, 513, 514

[56] References Cited

U.S. PATENT DOCUMENTS

| | | | |
|---|---|---|---|
| 4,086,708 | 5/1978 | Westelaken | 34/86 |
| 4,468,868 | 9/1984 | Mull et al. | 34/168 |
| 4,644,666 | 2/1987 | Eberle et al. | 34/86 |
| 4,821,428 | 4/1989 | Good | 34/86 |
| 5,018,281 | 5/1991 | Bulluck, Jr. | 34/514 |
| 5,182,871 | 2/1993 | Karls | 34/169 |

*Primary Examiner*—James Larson
*Attorney, Agent, or Firm*—Robert W. Becker & Associates

[57] ABSTRACT

A dryer has a hopper for material to be dried and an inlet line for supplying dry air to the hopper. A heating device for heating the dry air to the desired drying temperature before introduction into the hopper is provided. A return line is connected to the hopper for removing moist air from the hopper which results from the dry air passing through the material in the hopper and absorbing moisture therefrom. The return line has a part that functions as a heat exchanger. The dry air before entering the hopper is guided through the heat exchanger.

16 Claims, 6 Drawing Sheets

DRYER

BACKGROUND OF THE INVENTION

The present invention relates to a dryer with at least one hopper for material to be dried and with at least one inlet line for dry air. The dry air is heatable with a heating device to a desired drying temperature and flows, after passing through the material to be dried within the at least one hopper, into a return line connected thereto.

In the hopper of such known dryers the material to be dried is stored. Such material is, in general, in the form of plastic granules or a flowable recycling material. Via the inlet line the dried air is introduced into the hopper in order to absorb the moisture of the material in the hopper. Via the return line the moist air is removed from the hopper. In these known dryers the air is circulated in an open circuit, i.e., the dry air is introduced from the exterior, heated to the drying temperature, and returned to the exterior, i.e., the surrounding atmosphere. This design results in a high energy consumption as well as heat loading of the surroundings.

In another dryer of the prior art the air is circulated in an open, mixed, or closed circuit. The return line is connected to the dry air inlet line. In the return line a valve is positioned for mixing the air with which valve the return line can be completely or partially closed relative to the dry air circuit. When this dryer of the prior art operates with an open circuit, i.e., the air mixing valve is closed, then the moist air is again returned into the surrounding atmosphere. When the air mixing valve is completely open or partially open, a portion of the moist air is returned into the dry air inlet line and is mixed with the dry air. This results in a reduced dew point since the moisture absorbing capacity of this mixed air in comparison to dry air is reduced.

It is therefore an object of the present invention to improve a dryer of the aforementioned kind such that it can be operated at reduced energy consumption, that only a small amount of heat is released to the surroundings of the dryer, that an optimal dew point is provided, and that the device is of a simple constructive design so that it can be manufactured inexpensively.

SUMMARY OF THE INVENTION

The dryer according to the present invention is primarily characterized by:

A hopper for material to be dried;

An inlet line for supplying dry air to the hopper;

A heating device for heating the dry air to a desired drying temperature before introduction into the hopper;

A return line connected to the hopper for removing moist air from the hopper that results from the dry air passing through the material in the hopper and absorbing moisture from the material; and The return line having a part that functions as a heat exchanger, wherein the dry air before entering the hopper is guided through the heat exchanger.

Preferably, the dryer further comprises a housing in which the heat exchanger is positioned, wherein the inlet line is connected to the housing.

Advantageously, the housing comprises a partition dividing the interior of the housing into a first and a second flow chamber, wherein the dry air flows in opposite directions through the first and the second flow chambers.

Preferably, the return line comprises two pipe sections and one of the pipe sections is located in the first flow chamber while the other pipe section is located in the second flow chamber. Expediently, the moist air flows in opposite directions through the two pipe sections. Alternatively, the moist air flows in the same direction through the two pipe sections.

Preferably, the direction of flow of the dry air through the first flow chamber is identical to the direction of flow of the moist air in the pipe section located in the first chamber. The direction of flow of the dry air through the second flow chamber is preferably identical to the direction of flow of the moist air in the pipe section located in the second chamber.

In a preferred embodiment of the present invention the dryer further comprises at least one feed line for connecting the heat exchanger to the hopper.

Preferably, the heating device is located in the at least one feed line.

Advantageously, the at least one feed line is positioned in the housing.

Expediently, the inlet line has a tube section that is positioned in the housing and the tube section surrounds at a distance a portion of the return line.

Preferably, the tube section has a transition into the feed line.

In a preferred embodiment of the present invention, the tube section and the feed line extend parallel to one another within the housing.

In yet another embodiment of the present invention, the inlet line is surrounded at a distance by a pipe section of the heat exchanger.

Preferably, the dry air and the moist air flow in opposite directions through the heat exchanger.

Preferably, the hopper is connected to the housing such that the hopper is positioned vertically above the housing, wherein the heating device is positioned within the housing.

Preferably, the return line exits from the hopper at a lower end thereof so as to be sealed relative to the housing.

Advantageously, the housing is connected to the hopper.

In a preferred embodiment of the present invention the dryer comprises two of the hoppers and two of the return lines with heat exchangers, wherein the two hoppers and the two return lines are connected in parallel.

Advantageously, the dry air and the moist air are guided separately.

In the inventive dryer the dry air is guided through the heat exchanger before entering the hopper. The return air or moist air flowing within the return line is hot and loaded with moisture. It transfers a portion of its heat to the dry air to be introduced into the hopper so that a reduced amount of energy is required for heating the dry air to the necessary drying temperature. At the same time the dry, cold inlet air cools the walls of the heat exchanger, respectively, its housing so that only a reduced amount of heat is released into the surroundings. The heat loading of the surroundings is thus reduced. The return air is not mixed with the dry air to be introduced so that an optimal drying effect at a low dew point can be achieved. This allows for the material within the hopper to be dried to the desired degree within the shortest possible amount of time. The inventive dryer is constructively simple, especially in view of the fact that the heat exchanger is formed by a part of the return line. The inventive dryer can thus be manufactured inexpensively.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1 through 6.

The inventive dryers are to be used to dry with air products such as plastic granules or recycling material in the form of flowable material before these products are used in further processing steps.

Figure 1:
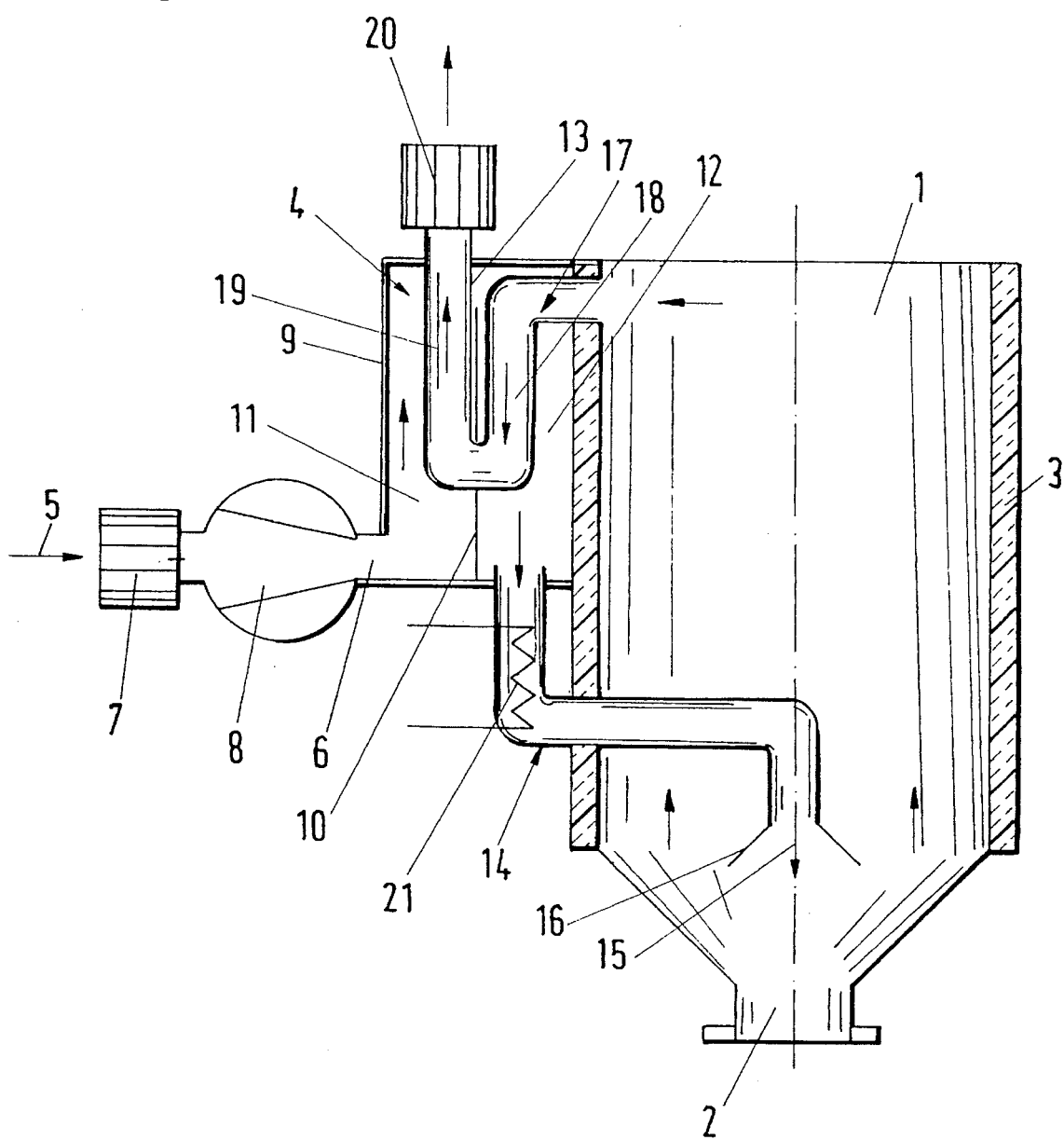
FIG. 1 shows a schematic representation of a first embodiment of an inventive dryer.

The dryer according to FIG. 1 has a hopper 1 in which the material to be dried is stored. At the lower end the hopper 1 tapers conically and is provided with an outlet opening 2 for the dried material. At the upper end of the conically tapered portion the cylindrical area of the hopper 1 is provided with an insulating jacket 3. A heat exchanger 4 is connected to the hopper 1. The dry air 5 is introduced into the heat exchanger 4. The dry air inlet line 6 is provided with an inlet filter 7 downstream of which a blower 8 is provided. Dirt particles are caught within the inlet filter 7 before the dry air 5 can enter the heat exchanger 4. The heat exchanger 4 comprises a housing 9 connected to the hopper 1. The housing 9 is divided by a partition 10 into two flow chambers 11 and 12. The dry air inlet line 6 opens at the lower end into the flow chamber 11 in which the dry air flows upwardly in the direction of the arrows. The upper end of the partition 10 at its is provided with a through opening 13 through which the dry air can enter the flow chamber 12. In the flow chamber 12 the dry air flows downwardly and counter to the flow direction in the flow chamber 11 into a feed line 14 that extends from the housing 9 in the downward direction and through the insulating jacket 3 into the hopper 1. The feed line 14 is downwardly bent along the axis of the hopper 1 and opens in the shape of a funnel. The dry air flows in the direction 15 downwardly from the funnel-shaped end 16 into the material to be dried. The funnel-shaped end 16 of the feed line 14 is positioned approximately at the level of the transition of the cylindrical part of the hopper 1 into the conical part of the hopper 1. The dry air then flows upwardly within the hopper 1 in a manner known per se in the direction of the shown arrows and dries the material in the hopper. At the upper end of the hopper 1 closed at the top the air is guided into the return line 17 connected to the hopper 1. The return line 17 is shaped within the heat exchanger in the form of a siphon. The return line 17 thus has two parallel, adjacently positioned pipe sections 18 and 19 that have a transition into one another. The pipe section 18 is positioned within the flow chamber 12 and the pipe section 19 is positioned within the flow chamber 11 of the heat exchanger 4. The pipe section 19 is guided upwardly out of the housing 9. Exterior to the housing 9 an outlet filter 20 is positioned within the pipe section 19. The return line 17 penetrates in a sealing manner the partition 10 of the housing 9.

The feed line 14 contains a heating device 21 positioned in the area between the housing 9 and the entry location of the feed line 14 into the hopper 1.

For drying the material within the hopper 1, dry air is sucked by the blower 8 and guided via the dry air inlet line 6 into the flow chamber 11. From here the dry air flows upwardly, passes through the through opening 13 into the flow chamber 12, and flows downwardly into the feed line 14. With the heating device 21 the dry air is heated to the required temperature for the drying process before the dry air enters the hopper 1. The heated dry air exits from the funnel-shaped end 16 of the feed tube 14 in the downward direction, flows upwardly through the material to be dried thereby absorbing moisture from the material. The air laden with moisture leaves from hopper 1 via the return line 17. Via the two pipe sections 18, 19 and the outlet filter 20 the moist air flows into the surrounded atmosphere or is regenerated by being passed through drying cartridges etc.

The dry air as well as the moist air are separately guided so that an optimal drying effect and an optimal dew point can be achieved. Since the introduced dry air is completely separated from the moist return air, only dry air is sucked into the hopper 1 so that the material contained in the hopper 1 can be dried in an optimal manner. A mixing of the dry inlet air with the moist return air does not take place.

An effective energy saving measure is provided by combining the insulating jacket 3 of the hopper with a heat exchanger 4. Energy is returned to the system by heat exchange: the return (moist) air flowing within the return line 17 heats the dry air introduced via the dry air inlet line 6 so that the heating device 21 only needs to provide only a correspondingly reduced amount of heat energy to the dry air. The heat exchanger 4 is embodied in an airtight manner between the flows of the hot return air and the cold dry inlet air. Due to the optimization of the internal energy balance the surrounding atmosphere is only loaded with heat to a minimal extent. Furthermore, the dryer is of an economic design because the heat exchanger 4 is formed by already present components of the dryer. No additional components are required for embodying the heat exchanger which would otherwise increase the manufacturing costs of the dryer.

Figure 2:
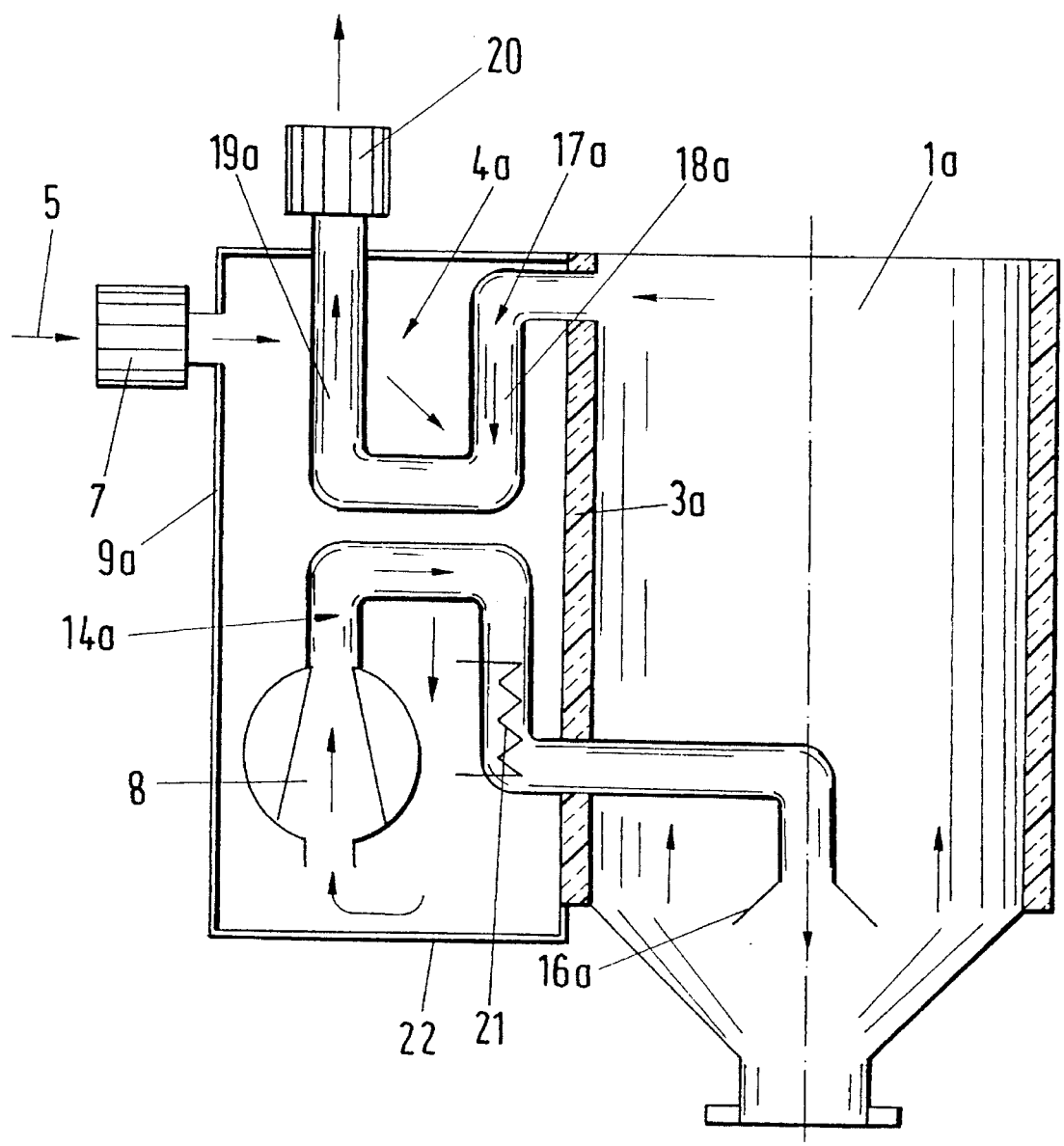
FIGS. 2–6 show in representations corresponding to FIG. 1 further embodiments of the inventive dryer.

In the embodiment according to FIG. 2 the introduction of dry air from the exterior is carried out through the heat exchanger housing 9a. As in the previous embodiment, the return line 17a is positioned with its two pipe sections 18a, 19a in the housing 9a. The housing 9a extends over the entire height of the cylindrical part of the hopper 1a and at its upper end is provided with an inlet opening for the dry air 5 which, as in the previous example, flows through the inlet filter 7 before entering the housing 9a. The cold dry inlet air 5, sucked in by the blower 8, flows within the housing 9a in a downward direction. The dry air flows past the two pipe sections 18a, 19a of the return line 17a and absorbs heat from the return air flowing through the return line 17a.

The blower 8 is positioned at the downwardly oriented inlet end of the feed line 14a. This inlet end is positioned in the vicinity of the bottom 22 of the housing 9a. Within the housing 9a the feed line 14a is U-shaped and is positioned within the area below the return line 17a. The heating device 21 is positioned within the feed line 14a so as to be positioned before the entry location of the feed line 14a into the hopper 1a. The heating device 21 heats the dry air 5 to the required drying temperature. As in the previously described example, the heated dry air exits from the funnel-shaped end 16a of the feed line 14a into the hopper 1a and is thus introduced into the material to be dried. Within the hopper 1a the dry air flows upwardly and absorbs moisture from the material to be dried. At the upper end of the hopper 1a, the moist air enters the return line 17 and exits via the outlet filter 20 to the exterior.

The cylindrical part of the hopper 1a, as in the previous embodiment, is provided with an insulating jacket 3a. The housing 9a does not require an additional insulation because the housing walls are cooled sufficiently by the cold air flowing within the housing 9a. The inlet air does absorb heat within the heat exchanger 4a; however, the temperature of the dry air flowing to the inlet end of the feed line 14a is still sufficiently low to provide for a satisfactory cooling of the walls of the housing 9a. Thus, in the same manner as disclosed in connection with the embodiment of FIG. 1, an additional insulation of the housing walls is avoided so that this dryer can also be produced in an economic manner. In this embodiment the dry inlet air and the moist return air are guided separately so that a good drying effect and an optimal dew point result. Only dry external air can reach the hopper 1a because a mixing of moist return air with dry inlet air does not take place. Furthermore, this dryer has the same advantages as the dryer of the embodiment according to FIG. 1.

The dryers according to FIGS. 1 and 2 save energy very effectively. The energy savings for a conventional range of drying temperatures between 80° and 140° C. are approximately within the area of 30% to 38%. Thus, a correspondingly reduced amount of energy is required for operating the dryer, and the surroundings of the dryer are subjected to a reduced heat loading. This is especially advantageous when, for example, a plurality of dryers are operated in a manufacturing hall. Accordingly, the heat loading of the manufacturing hall for a plurality of dryers is only minimal.

Figure 3:
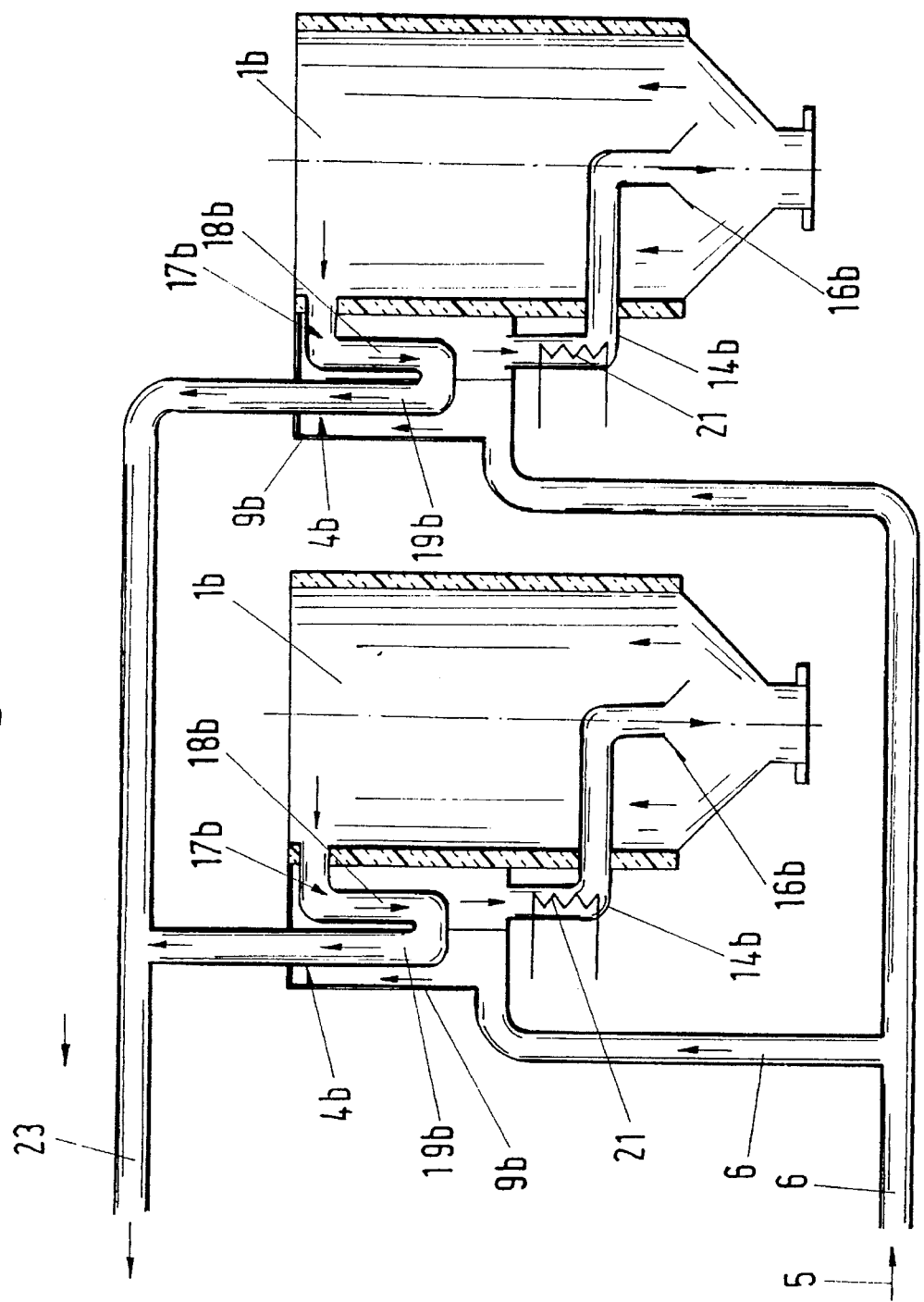

FIG. 3 shows a further embodiment in which two dryers are connected in parallel. The dryers are essentially identical to the embodiments of FIG. 1. The dry air 5 is introduced via a non-represented blower via the inlet line 6 into the two hoppers 1b. Each hopper 1b has a housing 9b for the heat exchanger in which the two pipe sections 18b, 19b of the return line 17b are positioned. The feed line 14b is connected to the bottom of the heat exchanger housing 9b, as shown in the embodiment according to FIG. 1. The heating device 21 is positioned in the feed line 14b in the area between the housing 9b and the entry location of the feed line 14b into the hopper 1b. Within the hopper 1b the feed line 14b is bent so as to extend along the axis of the hopper 1b in the downward direction. The lower end 16b is funnel-shaped and the dry air exits from the feed line 14b into the material to be dried at this location. Within the hopper 1b the dry air flows upwardly and absorbs in the manner described in connection with the other embodiments the moisture of the material to be dried. At the upper end of the hopper 1b the moist air flows into the return line 17b. Both return lines 17b are connected to a common outlet line 23 via which the return air is removed in a manner known per se. With the heat exchanger 4b the dry and cold inlet air 5 is heated, as described above, so that the respective heating devices 21 must provide only a correspondingly reduced amount of energy in order to heat the inlet air to the required drying temperature. At the same time, the cold inlet air cools the walls of the housings 9b so that the walls of the housings 9b must not be insulated in a special manner.

In the disclosed manner it is also possible to combine more than two hoppers 1b so that simultaneously with a plurality of dryers different materials can be dried at different temperatures. It is furthermore possible to control the supply of dry air to the individual hoppers 1b by providing shut-off valves. For example, it is possible to provide within the inlet line 6 in the area between the two hoppers 1b a switching valve with which the introduction of dry air into the hopper 1b shown in the right half of the drawing FIG. 3 can be interrupted. In this scenario, the dry air only flows into the hopper 1b in the left half of the drawing FIG. 3.

Figure 4:
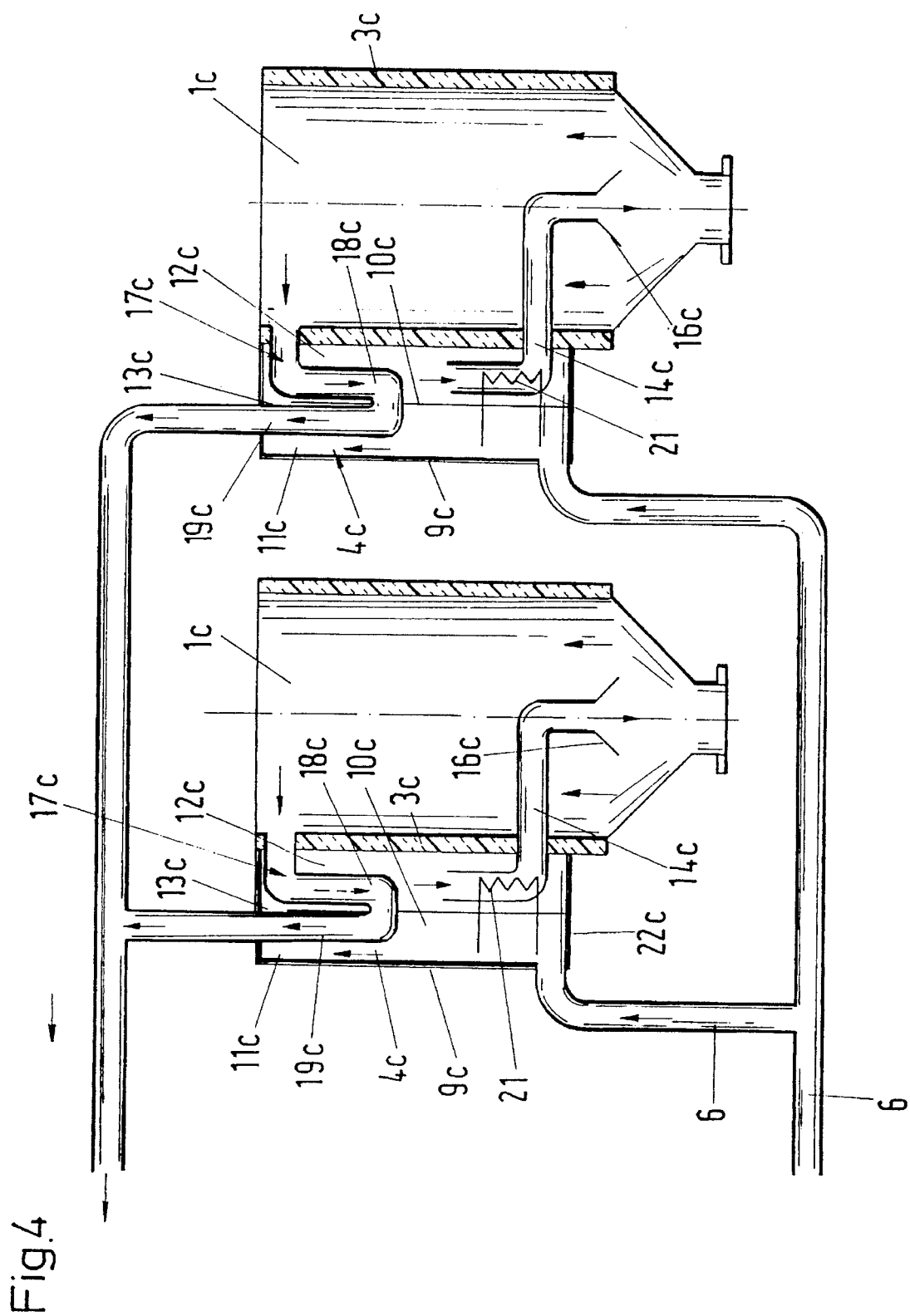

FIG. 4 shows an embodiment in which two hoppers 1c are combined. The housing 9c of the heat exchanger 4c extends approximately over the entire height of the cylindrical part of the hopper 1c which, as in the previous embodiments, is provided with an insulating jacket 3c. The inlet line 6 opens directly into the housing 9c adjacent to the bottom 22c. The housings 9c, as in the embodiment according to FIG. 1, are separated into two flow chambers 11c and 12c by partitions 10c. The dry air introduced via the inlet line 6 enters at the bottom 22c of the housing 9c into the flow chamber 11c and flows upwardly. The dry air passes through the through opening 13c at the upper end of the partition 10c into the flow chamber 12c of the housing 9c. In the flow chamber 12c the dry air flows downwardly and enters the feed line 14c the inlet end of which is positioned within the flow chamber 12c of the housing 9c. The heating device 21 for heating the dry air to the required drying temperature is positioned in the feed line 14 within the flow chamber 12c of the housing 9c.

Within the flow chamber 12c the feed line 14c extends substantially vertically downwardly and has a transition, as in the embodiment according to FIG. 1, into a horizontal portion with which the feed line 14c extends into the corresponding hopper 1c. Within the hopper 1c the feed lines 14c are provided with a centrally arranged and downwardly oriented portion with a funnel-shaped end 16c from which the heated dry air enters into the material to be dried. Within the hopper 1c the dry air flows upwardly through the material, absorbs its moisture, and flows into the corresponding return line 17c which is connected to the upper end of the hopper 1c. Within the housing 9c the two pipe sections 18c and 19c of the return line 17c extend parallel to one another whereby according to the embodiment of FIG. 1 the pipe section 18c is positioned within the flow chamber 12c and the pipe section 19c is positioned within the flow chamber 13c of the housing 9c. The dry and cold inlet air which enters via the line 6 into the housing 9c flows along the two pipe sections 18c, 19c and is thus preheated by the return air contained within these pipe sections. Since the pipe sections 18c, 19c extend in the flow direction of the dry air within the flow chambers 11c, 12c, an optimal heat exchange is ensured within the heat exchanger 4c. Accordingly, the heating device 21 must only provide a correspondingly reduced amount of heat energy in order to heat the inlet air to the required drying temperature.

In this embodiment it is also possible to use more than two hoppers 1c the inlet lines of which can also be separately switched so that a particular one of the hoppers 1c can be removed from the drying process, as desired.

For the embodiments according to FIGS. 3 and 4 the combination of a plurality of hoppers provides further advantages. When the throughput of material to be dried is reduced in the hoppers 1b, 1c, the temperature of the return air in the return lines 17b, 17c increases. Thus, in the corresponding heat exchangers 4b, 4c more energy is transferred to the cold inlet air. The required heating power is thus reduced. This effect is possible without any additional components (automatic control). When coupling, respectively, switching in parallel a plurality of dryers with one common air circuit, it is possible to adjust different heating temperatures with the heating devices 21. In this case, the energy return at higher heating temperatures is automatically greater. The return air temperature is thus substantially reduced in each dryer. The energy loss by radiation at the outlet line 23 is thus reduced in this manner.

Figure 5:
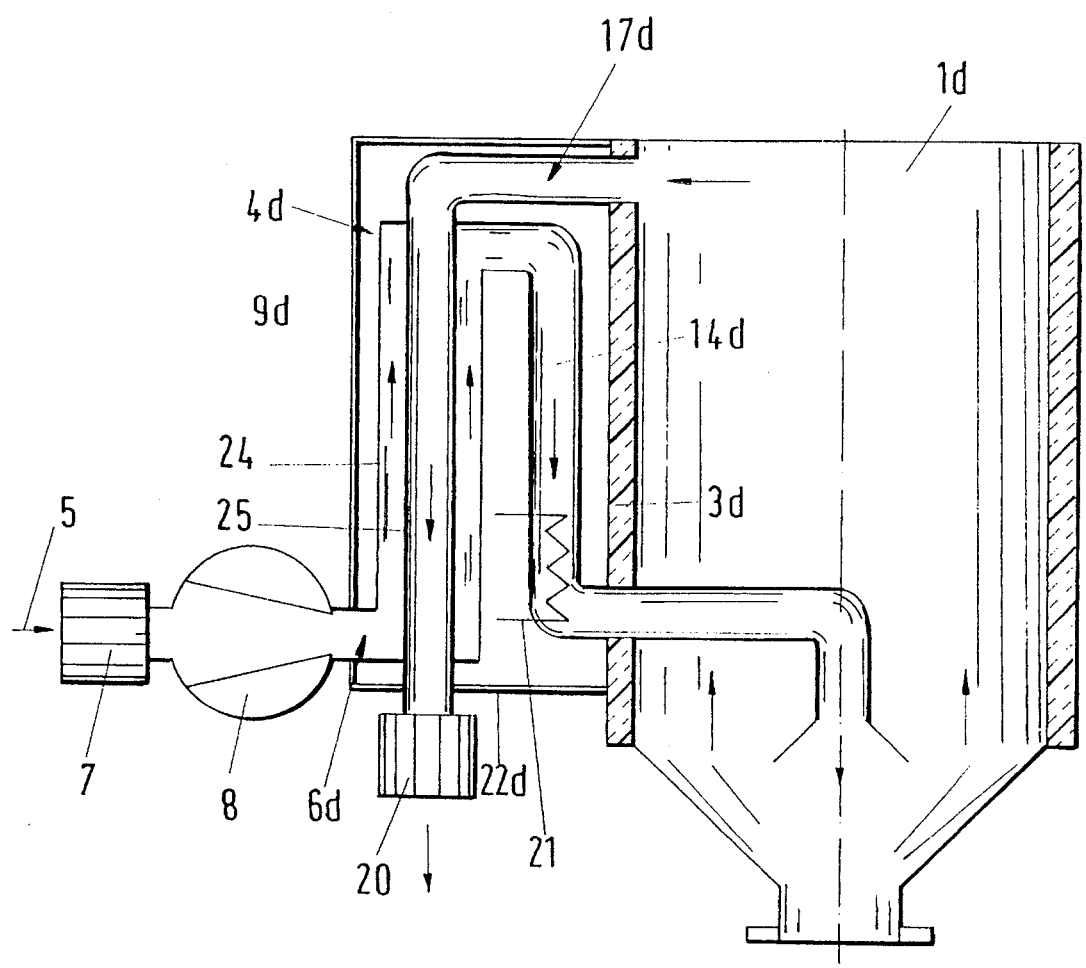

In the embodiment according to FIG. 5 the return line 17d penetrates in a sealing manner the dry air inlet line 6d. The inlet air 5, sucked in by the blower 8, passes via the inlet filter 7 into the dry air inlet line 6d that is sealed within the housing 9d of the heat exchanger 4d. Within the housing 9d the inlet line 6d has an upwardly extending line section 24 that has an angular portion at the upper end of the housing 9d and a transition into a downwardly oriented end section forming the feed line 14d. In this feed line 14d the heating device 21 is positioned. The feed line 14d extends from the housing 9d in a sealed manner through the insulating jacket 3d into the hopper 1d, as is, for example, also disclosed in connection with FIG. 2.

The return line 17d, which is connected to the upper end of the hopper 1d, is bent downwardly within the housing 9d at a right angle. This pipe section 25 extends through the pipe section 24 of the dry air inlet line 6d the cross-section of which is greater than the cross-section of the pipe section 25. The cold, respectively, cool drying air thus flows along the entire circumferential outer surface of the pipe section 25. The pipe section 25 of the return line 17d is, of course, sealed relative to the pipe section 24 of the inlet line 6d. The line section 25 extends downwardly past the bottom 22d of the housing 9d. The projecting end of the line section 25 is provided with the outlet filter 20.

The material to be dried which is stored in the hopper 1d is dried by the dry air which is introduced via the inlet line 6 and which has been heated by the heating device 21 to the required drying temperature. Within the hopper 1d the dry air flows upwardly and enters as moist air the return line 17d. The dry and cold inlet air which flows within the inlet line 6d, respectively within its pipe section 24, absorbs heat from the moist air which flows in the opposite direction within the pipe section 25 so that the heating device 21 only needs to provide a correspondingly reduced amount of energy in order to heat the dry air to the required drying temperature. In this embodiment, the dry air and the moist return air are also guided separately so that a mixing does not occur. The dry air is guided along the entire length of the pipe section 24 positioned within the pipe section 25 of the return line 17d so that an intensive heat exchange occurs.

This dryer, in analogy to the dryer of FIG. 2, can be switched in parallel with other dryers as shown in FIGS. 3 and 4.

Figure 6:
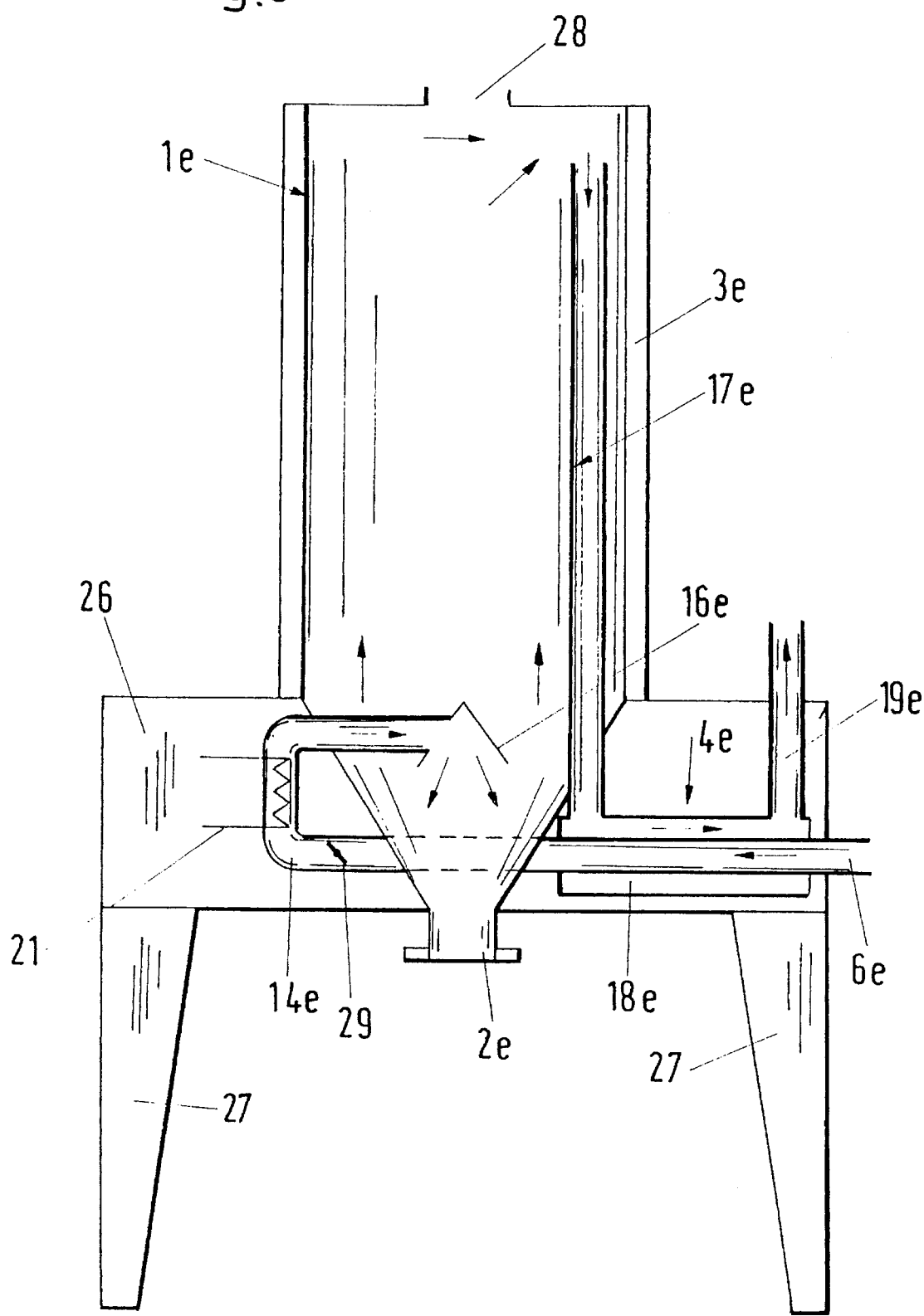

In the embodiment according to FIG. 6 the hopper 1e is connected to a table 26 with legs 27 for supporting the dryer on the floor. The conically tapered end of the hopper 1e extends downwardly from the table 26 so that the outlet opening 2e, which, as in the previous embodiments, is closed in a manner known per se by a slide, is positioned below the table 26. The cylindrical section of the hopper 1e extends from the upper side of the table 26 upwardly and is provided with an insulating jacket 3e over its entire height. The dry air inlet line 6e is guided within the table 26 which is in the form of a hollow body. The dry air inlet line 6e extends at a short distance above the bottom of the table 26 and has a transition with the table into the U-shaped feed line 14e which extends into the conically tapered end of the hopper 1e. At the free end of the horizontally extending section of the feed line 14e the downwardly extending funnel-shaped end 16e is provided from which the dry air enters in the downward direction into the hopper 1e. This end 16e is positioned, as in the previous embodiments, along the axis of the hopper 16e approximately at the level of the transition of the cylindrical part into the conically tapered end section of the hopper 1e. In the vertically extending portion of the feed line 14e the heating device 21 is positioned with which the dry air is heated to the desired drying temperature before entering the hopper 1e.

The hopper 1e at the upper end, as shown in the previous embodiments, is provided with an inlet 28 for the material to be dried. In the vicinity of the side wall of the cylindrical part of the hopper 1e the return line 17e is positioned. Its inlet end is close to the upper end of the hopper 1e. The return line 17e extends vertically downwardly and penetrates the conically tapered end of the hopper 1e. Its pipe section 18e is arranged within the table 26 exterior to the hopper 1e and has a transition at a right angle to the pipe section 19e that is guided upwardly away from the table 26. The pipe section 18e surrounds the dry air inlet line 6e at a distance. The pipe section 18e and the inlet line 6e together form the heat exchanger 4e.

For drying the material contained within the hopper 1e, the dry air is guided via the inlet line 6e and the feed line 14e into the hopper 1e. The heating device 21 heats the dry air, if necessary, to a certain drying temperature. Within the hopper 1e the dry air, which is optionally preheated, exits via the funnel-shaped end 16e in the downward direction, flows through the material, and absorbs moisture from the material. The air laden with moisture flows from the upper end into the return line 17e via which it is removed from the hopper. Within the pipe section 18e the moist air flows counter to the dry air flowing within the line 6e. Thus, the dry air within the dry air inlet line 6e is preheated by the moist air flowing within the pipe section 18e so that the heating device 21 arranged downstream must provide only a reduced amount of heating energy for heating the dry air to the desired drying temperature before entering the hopper 1e. The dry air entering the hopper 1e is thus preheated by the return air leaving the hopper 1e. The tube lengths of the heat exchanger 4e are selected according to the required heating output in order to reach an efficiency of up to 40%.

Within the feed line 14e a closure valve 29 is provided (in the flow direction upstream of the heating device 21) with which the flow rate of dry air can be controlled.

When no material is removed from the hopper 1e, the material within the hopper 1e is heated to a greater extent as if material were removed constantly. Thus, the air flowing through the material is heated to a greater extent so that within the heat exchanger 4e the inlet air flowing through the inlet air line 6e is correspondingly heated to a greater extent. A temperature sensor is preferably provided within the dry air inlet line 6e upstream of the heating device 21. This temperature sensor measures the actual temperature of the dry air and controls the output of the heating device 21 accordingly. When the dry air to be introduced into the hopper is heated to a high temperature, the output of the heating device 21 is thus reduced by the temperature sensor, and energy is saved.

The return air flowing through the pipe section 19e can be released into the surrounding atmosphere or can be introduced into the dry air inlet line 6e so that the return air can be used again as dry air. In such a circuit it is suggested to provide at least one drying cartridge through which, if necessary, the return air can be guided in order to remove moisture therefrom before reintroduction into the inlet air of the inlet air line 6e.

The heat exchanger 4e is positioned within the table 26 and is thus not visible from the exterior. Instead of the table 26 with legs 27 it is also possible to provide a housing etc. in which the heat exchanger with its corresponding lines can be arranged in a protected manner.

The inlet air can be exterior air, predried air, gases, or any other suitable air stream. Instead of the disclosed blower it is also possible to use a suction device that is advantageously connected within the return line. In all of the shown embodiments the heat exchanger can also be provided separate from the hopper.

The present invention is, of course, in no way restricted to the specific disclosure of the specification and drawings, but also encompasses any modifications within the scope of the appended claims.

What we claim is:

1. A dryer comprising:

a hopper for material to be dried;

an inlet line for supplying dry air to said hopper;

a heating device for heating the dry air to a desired drying temperature before introduction into said hopper;

a return line connected to said hopper for removing moist air from said hopper that results from the dry air passing through a material in said hopper and absorbing moisture from the material;

said return line having a part that functions as a heat exchanger, wherein the dry air before entering said hopper is guided through said heat exchanger;

a housing in which said heat exchanger is positioned, wherein said inlet line is connected to said housing; and said housing comprising a partition dividing the interior of said housing into a first and a second flow chamber and wherein the dry air flows in opposite directions through said first and said second flow chambers.

2. A dryer according to claim 1, wherein said return line comprises two pipe sections and wherein one of said pipe sections is located in said first flow chamber and the other pipe section is located in said second flow chamber.

3. A dryer according to claim 2, wherein the moist air flows in opposite directions through said two pipe sections.

4. A dryer according to claim 2, wherein a direction of flow of the dry air through said first flow chamber is identical to a direction of flow of the moist air in said pipe section located in said first chamber and wherein a direction of flow of the dry air through said second flow chamber is identical to a direction of flow of the moist air in said pipe section located in said second chamber.

5. A dryer according to claim 1, wherein said housing is connected to said hopper.

6. A dryer according to claim 1, comprising two of said hoppers and two of said return lines with said heat exchanger, said two hoppers and two return lines connected in parallel.

7. A dryer according to claim 1, wherein the dry air and the moist air are guided separately.

8. A dryer comprising:

a hopper for material to be dried;

an inlet line for supplying dry air to said hopper;

a heating device for heating the dry air to a desired drying temperature before introduction into said hopper;

a return line connected to said hopper for removing moist air from said hopper that results from the dry air passing through a material in said hopper and absorbing moisture from the material;

said return line having a part that functions as a heat exchanger, wherein the dry air before entering said hopper is guided through said heat exchanger;

a housing in which said heat exchanger is positioned, wherein said inlet line is connected to said housing;

at least one feed line for connecting said housing to said hopper; and wherein said at least one feed line is positioned in said housing.

9. A dryer according to claim 8, wherein said heating device is located in said at least one feed line.

10. A dryer according to claim 8, wherein said inlet line has a tube section that is positioned in said housing and wherein said tube section surrounds at a distance a portion of said return line.

11. A dryer according to claim 10, wherein said tube section has a transition into said feed line.

12. A dryer according to claim 10, wherein said tube section and said feed line extend parallel to one another within said housing.

13. A dryer according to claim 8, wherein said inlet line is surrounded at a distance by a pipe section of said heat exchanger.

14. A dryer according to claim 13, wherein the dry air and the moist air flow in opposite directions through said heat exchanger.

15. A dryer according to claim 13, wherein said hopper is connected to said housing such that said hopper is positioned vertically above said housing, wherein said heating device is positioned within said housing.

16. A dryer according to claim 15, wherein said return line exits from said hopper at a lower end thereof so as to be sealed relative to said housing.

* * * * *